2,736,724

DISAZO DYESTUFFS

Piero Maderni, Basel, Switzerland, assignor to Sandoz A. G., Basel, Switzerland, a Swiss firm No Drawing. Application August 24, 1953, Serial No. 376,239

Claims priority, application Switzerland September 18, 1952

7 Claims. (Cl. 260—175)

The present invention relates to disazo dyestuffs.

It is an object of the invention to embody disazo dyestuffs of superior properties, particularly as regards capacity for drawing onto cotton and fibers of regenerated cellulose and as regards fastness properties of dyeings of the metallized dyes.

In accordance with the present invention the aforesaid object is realized by the class of disazo dyestuffs which contain two sulfonic acid groups and which correspond to the formula

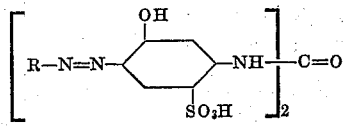

wherein R stands for a radical of the naphthalene series containing an OH group in ortho position to the —N=N— group.

The aforesaid disazo dyestuffs are prepared, according to this invention, by tetrazotizing one mol of 4,4'-diamino - 3,3'-dihydroxydiphenyl-1,1'-urea-6,6'-disulfonic acid and then coupling the resultant tetrazo compound with two mols of a non-sulfonated and non-carboxylated hydroxynaphthalene, in ortho position to the hydroxy group thereof.

Hydroxynaphthalenes which are suitable for use as azo components in the preparation of the dyestuffs of the present invention comprise inter alia 2-hydroxynaphthalene, 2-hydroxynaphthalene-sulfonic acid amides and their N - substituted derivatives, 2,7 - dihydroxynaphthalene, 2-hydroxy-6-methoxynaphthalene, 2-hydroxy-7-methoxynaphthalene, 2-hydroxy-8-acylaminonaphthalene, 2 - hydroxy - 8-carbalkoxyaminonaphthalene, 1-hydroxy-4 - methylnaphthalene, 1-hydroxy-4-benzoylnaphthalene, 1 - hydroxy - 5,8 - dichloronaphthalene, 1,5 - dihydroxynaphthalene, etc.

The coupling of the tetrazotized urea derivative with the azo component is preferably carried out in a medium made alkaline with sodium hydroxide or potassium hydroxide, and in some cases also in the presence of an organic tertiary base such as pyridine, quinoline or a crude pyridine base mixture. Upon completion of the coupling, the resultant disazo dyestuff is isolated in the conventional way and dried.

The said disazo dyestuffs draw well onto cotton and fibers of regenerated cellulose, and the resultant dyeings can be treated with metal-yielding agents. The metallized dyeings are distinguished by outstanding fastness properties; thus, for example, the dyeings treated with a cation-active copper complex compound, which may be basic (such as is obtainable according to Swiss Patents Nos. 253,709 and 261,048 to 261,052), are fast to boiling and to acid and are particularly fast to light.

The following examples are illustrative but not restrictive of the invention. In these examples, the parts and percentages are by weight, and the temperatures are in degrees centigrade.

EXAMPLE 1

8.7 parts of 4,4'-diamino-3,3'-dihydroxydiphenyl-1,1'-urea-6,6'-disulfonic acid are dissolved in a solution consisting of 3.2 parts of sodium hydroxide and 130 parts of water. 2.8 parts of sodium nitrite are added to the solution which is then poured slowly at about 15° into a mixture of 18.5 parts of concentrated hydrochloric acid, 10 parts of water and 10 parts of ice. Upon completion of the reaction, the resultant tetrazo compound is precipitated by the addition of sodium chloride to the reaction solution, after which the precipitate is filtered off. The thus-obtained paste is introduced, at room temperature (20–30°) and while stirring, into a solution of 12.6 parts of 2-hydroxynaphthalene-6-carboxylic acid phenylamide, 10 parts of concentrated aqueous ammonium hydroxide solution, 10 parts of pyridine and 200 parts of water. After the coupling is over, the formed disazo dyestuff is precipitated by the addition of sodium chloride to the reaction solution, after which the precipitate is filtered off, washed with aqueous sodium chloride solution and dried under reduced pressure. The disazo dyestuff corresponds to the formula

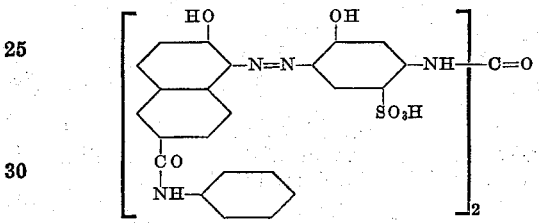

and dyes cotton and fibers of regenerated cellulose in red-violet shades which, in the coppered state, are of excellent wash-fastness and light-fastness.

EXAMPLE 2

8.7 parts of 4,4'-diamino-3,3'-dihydroxydiphenyl-1.1'-urea-6,6'-disulfonic acid are dissolved in 130 parts of an aqueous sodium hydroxide solution of 2½% strength. After the addition of 2.8 parts of sodium nitrite, the solution is run slowly, at about 15° and while stirring, into a mixture of 18.5 parts of concentrated hydrochloric acid, 10 parts of water and 10 parts of ice. Upon completion of the tetrazotization, 8.7 parts of 2-hydroxynaphthalene are introduced into the resultant suspension, and the reaction mass is adjusted to a pH value of 5–6 by the addition of about 7 parts of an aqueous sodium hydroxide solution of 30% strength. 10 parts of pyridine and 16 parts of an aqueous sodium hydroxide solution of 30% strength are then added, and stirring is continued until coupling is completed. The resultant disazo dyestuff is then precipitated by means of sodium chloride, filtered off, washed with an aqueous sodium chloride solution of 20% strength and dried under reduced pressure. The disazo dyestuff corresponds to the formula

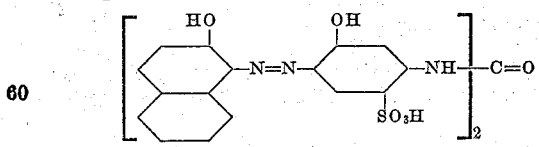

and dyes cotton and fibers of regenerated cellulose in red-violet shades which, in the coppered state, are of excellent fastness to washing, light, acid and alkali.

EXAMPLE 3

8.7 parts of 4,4'-diamino-3,3'-dihydroxydiphenyl-1,1'-urea-6,6'-disulfonic acid are tetrazotized after the manner described in the preceding example; the resultant tetrazo compound is then coupled with 7 parts of 2,7-dihydroxynaphthalene after the manner of the said examples. The thus obtained disazo dyestuff is precipitated from the reaction solution by the addition of acetic acid and is then filtered off and dried under reduced pressure. It corresponds to the formula

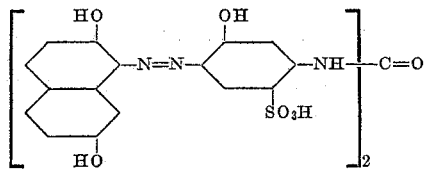

and dyes cotton and fibers of regenerated cellulose in Bordeaux-red shades which, in the coppered state, are fast to washing and to light.

EXAMPLE 4

8.7 parts of 4,4'-diamino-3,3'-dihydroxydiphenyl-1,1'-urea-6,6'-disulfonic acid are tetrazotized in the manner described in Example 2. Upon completion of the tetrazotization, 10.2 parts of 1-hydroxy-5,8-dichloronaphthalene are introduced into the suspension, after which coupling is carried out as described in the said example. The resultant disazo dyestuff corresponds to the formula

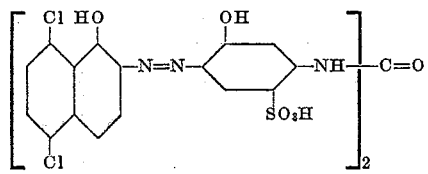

and dyes cotton and fibers of regenerated cellulose in violet shades which, in the coppered state, are of excellent fastness to washing, light, acid and alkali.

EXAMPLE 5

The process set forth in Example 4 is repeated except that the 10.2 parts of 1-hydroxy-5,8-dichloronaphthalene are replaced by 12.6 parts of 2-hydroxy-5-benzoylamino-naphthalene. A valuable disazo dyestuff is obtained, which corresponds to the formula

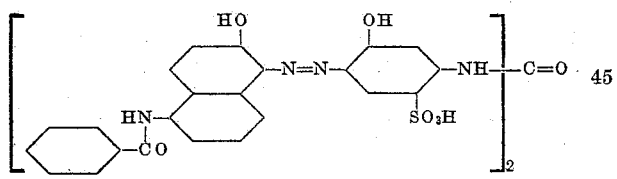

and dyes cotton and fibers of regenerated cellulose in red-violet shades which, in the coppered state, are characterized by excellent fastness properties.

EXAMPLE 6

8.7 parts of 4,4'-diamino-3,3'-dihydroxydiphenyl-1,1'-urea-6,6'-disulfonic acid are tetrazotized in the manner described in Example 2. 9.8 parts of 2-hydroxy-6-methylsulfonylnaphthalene are then introduced into the resultant tetrazo suspension, whereupon coupling to the disazo dyestuff takes place. The dyestuff is then precipitated from the alkaline coupling solution, after addition of hydrochloric acid, at a pH of about 9. The dyestuff is filtered off, washed with aqueous sodium chloride solution of 10% strength and dried at 70°. It corresponds to the formula

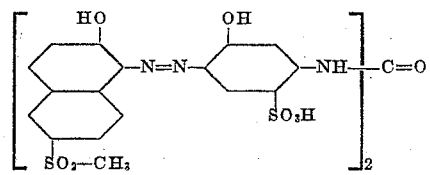

and dyes cotton and fibers of regenerated cellulose in Bordeaux red shades which, in the coppered state, possess excellent fastness to washing, light, acid and alkali.

The following table sets forth additional dyestuffs which are obtained, according to the present invention, by coupling 1 mol of tetrazotized 4,4-diamino-3,3'-dihydroxy-diphenyl-1,1'-urea-6,6'-disulfonic acid with 2 mols of the respectively indicated non-sulfonated and non-carboxylated hydroxynaphthalene essentially after the manner set forth in the preceding examples. The shade of the respective coppered dyeings on cotton is also set forth in connection with each dyestuff in the table.

Table

| Example No. | Hydroxynaphthalene | Shade of the Coppered Dyeings on Cotton |
|---|---|---|
| 7 | 2-hydroxy-7-methoxynaphthalene | Bordeaux-red. |
| 8 | 2-hydroxy-5-(4'-methyl)-benzoyl-amino-naphthalene. | red-violet. |
| 9 | 2-hydroxynaphthalene-3-carboxylic acid-phenylamide. | Do. |
| 10 | 2-hydroxynaphthalene-3-carboxylic acid-(4'-methyl)-phenylamide. | Do. |
| 11 | 2-hydroxynaphthalene-6-carboxylic acid-(2'-methyl-4'-chloro)-phenyl-amide. | Do. |
| 12 | 2-hydroxynaphthalene-3-carboxylic acid amide. | Do. |
| 13 | 2-hydroxynaphthalene-3-carboxylic acid-(2'-hydroxy)-ethylamide. | Do. |
| 14 | 2-hydroxy-6-methylnaphthalene | Do. |
| 15 | 2-hydroxy-6-tert.-amylnaphthalene | Do. |
| 16 | 2-hydroxynaphthalene-6-sulfonic acid amide. | violet. |
| 17 | 2-hydroxy-8-formylaminonaphthalene | reddish blue. |
| 18 | 2-hydroxy-8-acetylaminonaphthalene | Do. |
| 19 | 2-hydroxy-8-carbomethoxyamino-naphthalene. | blue. |
| 20 | 2-hydroxy-8-carbethoxyaminonaphthalene. | Do. |
| 21 | 2-hydroxy-8-carbopropoxyamino-naphthalene. | Do. |
| 22 | 2-hydroxy-8-carbo-(2'methoxy)-ethoxyaminonaphthalene. | Do. |
| 23 | 1-hydroxy-4-chloronaphthalene | brown. |
| 24 | 2-hydroxynaphthalene-6-sulfonic acid methylamide. | violet. |
| 25 | 2-hydroxynaphthalene-6-sulfonic acid-(2'-hydroxy)-ethylamide. | Do. |
| 26 | 2-hydroxy-8-propionylamino-naphthalene. | reddish-blue. |

EXAMPLE 27

100 parts of cotton are entered at 40° into a bath consisting of 2 parts of the dyestuff obtained according to Example 1 and 3000 parts of water. The dyebath is heated to boiling in the course of 30 minutes and maintained at boiling for 15 minutes. During this time 40 parts of anhydrous sodium sulfate are added to the bath portionwise. Upon completion of the dyeing process, the bath is cooled to 50 to 60° in the course of 30 minutes. The dyed material is removed and rinsed with cold water.

The rinsed cotton dyeing is digested for 30 minutes at 60-70° in an after-treating bath consisting of 3 parts of crystalline copper sulfate, 1 part of concentrated acetic acid and 3000 parts of water, after which it is again rinsed and then dried.

According to a second form of after-treatment, the rinsed, dyed material is moved about for 30 minutes at 60-70° in a bath consisting of 3000 parts of water and 3 parts of a copper-containing dicyandiamide condensation product after which the coppered dyeing is rinsed and finally dried.

Dyeing may be carried out with any of the dyestuffs of Examples 2 to 26 inclusive in the same way as hereinbefore described for the dyestuff according to Example 1.

Having thus disclosed the invention what is claimed is:

1. A disazo dyestuff which contains two sulfonic acid groups and which corresponds to the formula

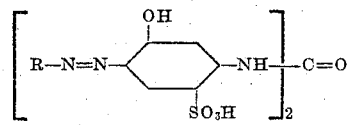

wherein R stands for a radical of the naphthalene series having an OH group in ortho position to the -N=N- group.

2. A disazo dyestuff which corresponds to the formula

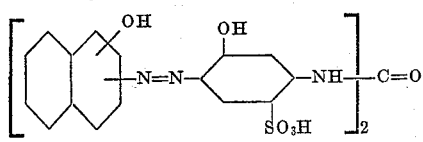

wherein the hydroxy group linked to the naphthalene radical stands in ortho position to -N=N- and wherein the hydroxynaphthalene radical is selected from the group consisting of further unsubstituted hydroxynaphthalene and chlorine-, hydroxy-, methoxy-, lower alkyl-, methylsulfonyl-, sulfonic acid amide-, carboxylic acid amide-, acylamino- and lower carbalkoxyamino-substituted hydroxynaphthalene.

3. The disazo dyestuff which corresponds to the formula

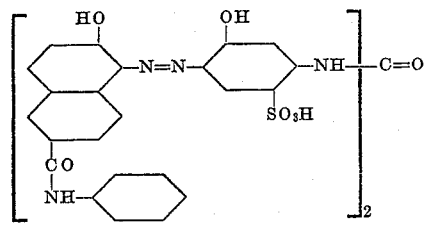

4. The disazo dyestuff which corresponds to the formula

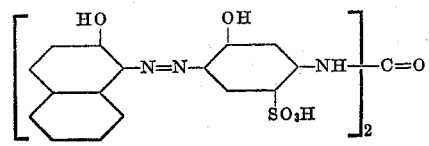

5. The disazo dyestuff which corresponds to the formula

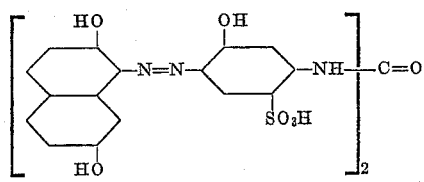

6. The disazo dyestuff which corresponds to the formula

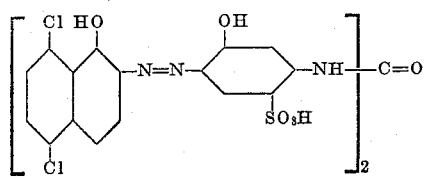

7. The disazo dyestuff which corresponds to the formula

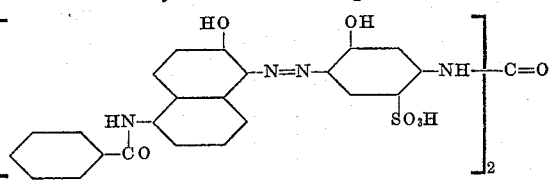

References Cited in the file of this patent
FOREIGN PATENTS

| | | |
|---|---|---|
| 20,216 | Great Britain | of 1910 |
| 167,387 | Switzerland | May 16, 1934 |